C. N. BENTLEY.
RESILIENT TIRE.
APPLICATION FILED JULY 26, 1915.
1,192,842.
Patented Aug. 1, 1916.
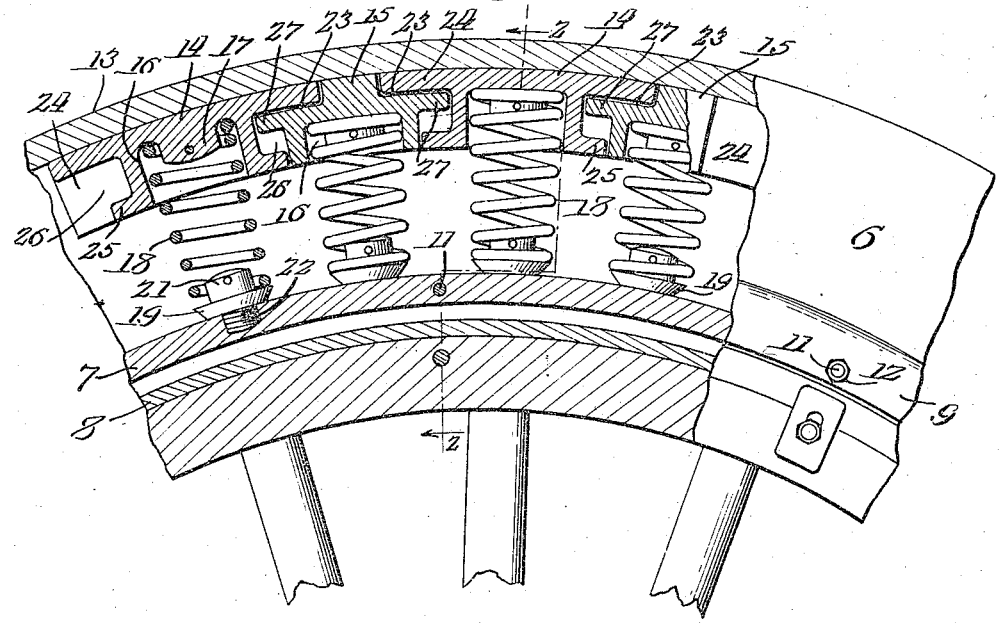
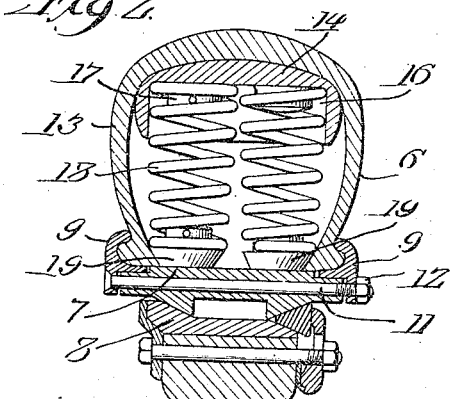
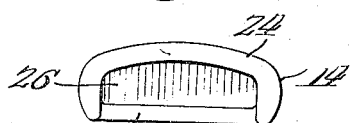
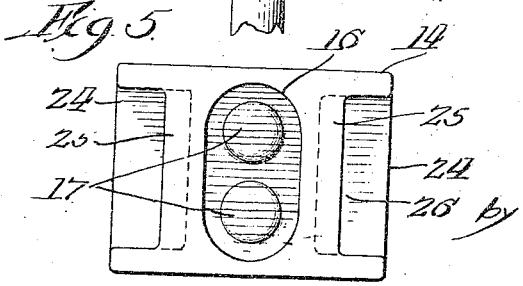
Inventor:
Cecil N. Bentley
by Pond & Wilson
Attys.

UNITED STATES PATENT OFFICE.

CECIL N. BENTLEY, OF FREEPORT, ILLINOIS.

RESILIENT TIRE.

1,192,842.

Specification of Letters Patent.

Patented Aug. 1, 1916.

Application filed July 26, 1915. Serial No. 41,997.

*To all whom it may concern:*

Be it known that I, CECIL N. BENTLEY, a citizen of the United States, residing at Freeport, in the county of Stephenson and State of Illinois, have invented certain new and useful Improvements in Resilient Tires, of which the following is a specification.

This invention relates to resilient tires such as are used on various types of vehicles, and has more particular reference to tires embodying a flexible casing such, for instance, as the well known outer casing used with pneumatic tires, and cushioning means arranged within the casing serving as the resilient medium similar to the air under pressure in pneumatic tires.

My invention contemplates, primarily, the provision of a resilient tire such that will not be subject to the objectionable features of pneumatic tires; one that, comprising but few differently constructed parts, will be easy to manufacture.

My object also is to provide a resilient tire having a cushioning or resilient means of novel construction. This cushioning means, I have designed in the form of a plurality of metallic shoes arranged in abutting relation within a tire casing and conforming to the curvature of the inner face thereof, and constructed so that each shoe is independendently movable in a radial direction and coöperates with its adjoining shoes to hold the same in alinement and to limit their radial movement, and individual springs for constantly urging each shoe outwardly against the casing.

My invention, its mode and principle of operation will become better understood by reference to the following description when considered in connection with the accompanying drawing, wherein I have illustrated one practical embodiment, and wherein:

Figure 1 is a longitudinal sectional view of a vehicle tire constructed according to the principles of my invention; Fig. 2 is a cross sectional view taken on the line 2—2 of Fig. 1; Figs. 3 and 4 are views of two differently constructed shoes, a plurality of which are employed in the cushioning means; and Fig. 5 is a view of the under side of the shoe shown in Fig. 3.

The tire, designated in general by reference character 6, is shown in the drawing as provided with a rim 7 demountably secured to the wheel rim 8 by suitable means, in the present case, by a conventional and well known type of mounting; and it should be understood that the particular form of tire rim mounting constitutes no part of my invention.

Clencher rings 9, suitably associated with the tire rim 7 so as to be detachable, are each adapted to be drawn inwardly on the tire rim by means of bolts 11 passing transversely through the tire rim, the bolts being secured at one end to one of the clencher rings and passed through apertures in the other ring and provided with nuts 12 bearing against the outer side of the latter ring for the purpose of drawing the two rings inwardly. A clencher tire 13 is mounted on the tire rim, engaged by the clencher rings 9.

The tire is made resilient by the provision of cushioning means of novel construction arranged within the tire casing, which will now be described. The cushioning means comprise, generally speaking, a plurality of shoes arranged within the casing in abutting relation, shaped to conform to the curvature of the inner face of the casing, and held yieldingly thereagainst by springs. The shoes are of two different constructions arranged in alternating relation, one series being designated in general by reference character 14 and the other by 15, and are preferably cast of some metal light in weight, such as aluminum. Each shoe is provided on its inner side with a socket 16 and depending studs 17 adapted to receive and hold against lateral displacement the outer ends of a pair of coiled expansion springs 18 spaced apart transversely of the tire. These springs are retained in position at their inner ends by tapering studs 19 having reduced outer ends 21 which project into the springs and inner ends 22 threadingly engaged in the tire rim 7. Pins or any suitable means may be employed to secure the ends of the springs to the studs 17 and 21.

It will be here noted that the members 19 are shaped so as to form part of the means for securing the clencher tire to the tire rim. The outer faces of the shoes are shaped to conform to the curvature of the inner face of the tire casing, and, as shown clearly in Fig. 1, it will be seen that but a small portion of the outer faces of the shoes 15 engage the tire casing. This is due to the shoes 15 being formed at each end with depressions 23 extending transversely over the entire outer end portions and adapted to receive the extensions 24 of the shoes 14. The extensions 24 form, together with the flanges 25, sockets 26 in each end of the shoes 14, in which extensions 27 of the shoes 15 project. The sockets 26 and extensions 27 are so constructed that each shoe may be moved in a radial direction independently of the other, and is limited in this movement by the coöperating portions of the shoes, continued movement in a given direction causing both of two adjoining shoes to move in that direction in unison.

By the foregoing construction, it will be noted that the shoes are interengaged for the purpose of permitting radial movement of the shoes separately and jointly, and the entire end portions of the shoes 15 fit into and coöperate with the extensions 24 for holding the shoes in alinement. Thus the ends of the shoes are constructed so as to permit each shoe to move separately a given radial distance and then in unison with its adjoining shoe, and hold the shoes in alinement at all times. Such radial movements of the shoes give a thorough flexibility to the tire, designed to accommodate it in a cushioning action to whatsoever obstructions or irregular surface the tire passes over, and to afford an efficient resiliency.

While I have shown and described one embodiment of my invention, it should be understood that various changes in the details of construction might be made without departing from the spirit and scope of the invention as set forth in the appended claims.

I claim:

1. The combination with a flexible tire casing, of a plurality of shoes disposed within the said casing in substantially abutting relation, means yieldingly urging the shoes outwardly into engagement with the inner wall of the tire casing, each alternate shoe having protruding opposite end portions spaced inwardly from the tire casing, and each of the remaining shoes having at its opposite ends a pair of radially spaced end portions between which the protruding end portions of adjoining sections are disposed and movable radially, whereby the shoes are held in coöperative relation and are themselves determinative of the range of radial movement of the adjoining shoes.

2. The combination with a flexible tire casing, of a plurality of shoes disposed within the casing in substantially abutting relation and constituting a continuous shoe adapted to bear against the inner wall of the casing, each alternate shoe being shaped at its ends to provide radially spaced, opposed abutments, each of the remaining shoes having end portions disposed between said abutments and movable radially therebetween, springs constantly urging each shoe outwardly whereby said alternate shoes will be held against the inner wall of the casing and the remaining shoes will be limited in their outward movement by the outer abutments of the alternate shoes and whereby also any of said remaining shoes may be moved inwardly a distance limited by the inner abutments of its adjoining shoes.

3. The combination with a flexible tire casing, of a plurality of shoes disposed within the said casing in substantially abutting relation and shaped on their outer faces to conform to the inner wall of the casing, the alternate shoes being formed on the outer side of their end portions with arcuate depressions and the remaining shoes having arcuate ends extending into the said depressions, springs constantly urging the shoes outwardly whereby the shoes having the projecting ends will be held in engagement with the tire casing and the said alternate shoes will be held in engagement with said projecting arcuate ends, the shoes having the projecting ends being provided with longitudinally projecting end portions spaced inwardly radially from their said arcuate ends and the said alternate shoes having end portions disposed between said inner and outer ends and being of less radial dimension than the radial distance between said inner and outer ends so that the said alternate shoes are movable in a radial direction relatively to the remaining shoes a distance limited by said inner and outer ends.

4. The combination with a flexible tire casing, of a plurality of shoes disposed within the casing in substantially abutting relation and shaped on their outer faces to conform to the inner wall of the casing, the ends of each alternate shoe being formed with arcuate recesses conforming generally to the general contour of the casing and the ends of each of the remaining shoes being formed with arcuate extensions projecting into the adjoining recesses and being of sufficiently smaller radial dimension than the radial dimension between the opposed faces of said arcuate recesses as to be capable of free radial movement between said opposed faces, said coöperating extensions and recesses serving also to hold the shoes against displacement when they are moved relatively by the action of the tire casing passing over irregular surfaces.

CECIL N. BENTLEY.